United States Patent Office 3,290,296
Patented Dec. 6, 1966

3,290,296
PROCESS FOR THE PRODUCTION OF IODOHY-
DRINS OR OF CYCLIC ETHERS DERIVED
THEREFROM
Derek Harold Richard Barton, Cambridge, Mass., assignor to Research Institute for Medicine and Chemistry Inc., Cambridge, Mass., a corporation of Massachusetts
No Drawing. Filed Mar. 4, 1964, Ser. No. 349,478
Claims priority, application Great Britain, Mar. 11, 1963,
9,559/63
16 Claims. (Cl. 260—239.55)

This invention concerns a process for the production of iodohydrins or of cyclic ethers derived therefrom.

In synthetic organic chemistry it is often required to introduce a cyclic ether grouping into a molecule, especially in the synthesis of steroids and alkaloids.

It is also useful to provide iodohydrins in which the iodine atom and hydroxyl group are either conformationally adjacent or are able to become conformationally adjacent since these can usually be converted into the desired cyclic ethers by removal of HI or the iodine atom may be replaced by other substituents such as ether, thioether, amino groups etc. thereby introducing useful groups onto a carbon atom which may not have previously carried substituents.

By the term "conformationally adjacent" atoms or groups is meant that these are so positioned that they may approach without appreciable molecular strain to within the distance normal for an interatomic bond. Thus, for example, in the steroids, a hydroxyl group in the $6\beta$-position is conformationally adjacent to a hydrogen at the 19-position while a hydroxyl in the $1\beta$-position is conformationally adjacent to a hydrogen at the $11\beta$-position.

It will be seen that in the above examples the conformationally adjacent atoms or groups are separated by a chain of four intervening carbon atoms, thereby allowing the conformationally adjacent atoms or groups to form part of a six-membered structure which, as is well-known, is normally substantially free from strain. Naturally, where the intervening carbon atoms form part of a structure in which bond rotation and movement is restricted, as in polycyclic structures such as steroids, the arrangement of all the bonds must allow the relevant atoms or groups to become adjacent.

It has been observed previously that when alcohols possessing a hydroxyl group conformationally adjacent to a hydrogen atom are reacted with iodine and lead tetraacetate, an oxide bridge is often formed between the carbon atoms carrying the said hydrogen and hydroxyl groups to produce a cyclic ether. It has also been suggested that a similar effect could be achieved by reacting the alcohol with a tertiary butyl hypohalite or with interhalogen compounds, cyanogen halides, N-halogenoamides, imides etc.

We have now found that such alcohols having a hydrogen atom conformationally adjacent to a hydroxyl group can be converted in a particularly advantageous manner either into cyclic ethers of the type described above, or into iodohydrins wherein the hydrogen atom which is, or is able to be, conformationally adjacent is replaced by iodine, by reaction with iodine and a hypochlorite, hypobromite or nitrite ester of a tertiary alcohol. While it is not wished to be bound by theoretical considerations, it appears that the active agents are thermal or photolytic free tertiary alkoxide radicals which abstract hydrogen from the OH group of the alcohol, the oxide radical so formed itself abstracting hydrogen intramolecularly from the conformationally adjacent position to leave a free carbon valency which is able to take up iodine to form an iodohydrin. The iodohydrin may then either remain and be isolated or, more frequently, spontaneously may eliminate HI to form a cyclic ether.

We have further found that instead of reacting the said alcohol with the tertiary hypohalite or nitrite ester and iodine, the alcohol may itself be converted into a nitrite ester and then reacted directly with iodine. Thermal or photolytic fission then leads directly to the desired free oxide radical which can form an iodohydrin or cyclise as described above.

The reaction mechanism involved when iodine and lead tetraacetate are used is somewhat different and a tertiary hypohalite alone must react in a still further way. The use of iodine and a hypochlorite, hypobromite or nitrite ester of a tertiary alcohol or the reaction of a nitrite ester directly with iodine gives rise to especially high yields of the desired product as compared with the previous methods and the reactants are more convenient and normally cheaper than lead tetraacetate or equivalent heavy metal reagents.

According to the present invention, therefore, there is provided a process for the preparation of cyclic ethers or of iodohydrins having a conformationally adjacent iodine atom and hydroxyl group, wherein an alcohol possessing a carbon-attached hydrogen atom which is, or is able to be, conformationally adjacent to the alcoholic hydroxyl group, is reacted with iodine and a hypochlorite, hypobromite or nitrite ester of a tertiary alcohol, or is converted to a nitrite ester and reacted with iodine, whereby the said hydrogen atom is replaced by an iodine atom to form an iodohydrin which may be converted into a cyclic ether by elimination of hydrogen iodide.

Where an ester of a tertiary alcohol is used, the tertiary alcohol is preferably an aliphatic alcohol, conveniently t-butanol.

It is preferred, however, first to convert the alcohol which is to be converted into an iodohydrin or ether into its nitrite ester since we have found this method can be used where sensitive groupings such as keto groups are present without the necessity of protecting such sensitive groups.

The reaction is effected by the application of energy either by the application of heat or radiation of a wavelength absorbed by the iodine and the hypohalite or nitrite.

In the thermal reaction, the temperature is preferably above 20° C., advantageously between 20° and 150° C. The reaction is advantageously effected in an inert solvent medium, the solvent being chosen having regard to its boiling point and the desired thermal conditions.

In the photolytic reaction, the radiation may be supplied, for example, by a high pressure mercury arc lamp, which gives radiation of the wavelength absorbed by the hypohalite or nitrate radical and by iodine. The reaction is preferably carried out in an inert solvent medium and the solvent chosen will be one which dissolves the reactants and does not substantially absorb radiation of the photolytic wavelength. Thus, for example chlorinated hydrocarbon solvents such as carbon tetrachloride may be used in many steroid photolyses since they dissolve many steriods and are not substantially opaque to the required radiation.

In the general case it is not necessary for all the atoms intervening between the conformationally adjacent groups of the alcohol reactant to be carbon and in general it is possible for at least one intervening atom to be oxygen, nitrogen or sulphur, provided that the compound is chemically stable and that the atoms carrying the conformationally adjacent atoms or groups are both carbon. The process of the invention is thus of particular use in converting compounds having the grouping

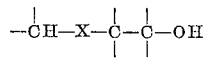

into iodohydrins having the grouping

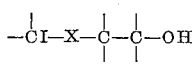

or the cyclic ethers containing the grouping

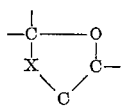

which may be formed therefrom, X being a methylene, methylidene, methylidyne or imino group or an oxygen, nitrogen or sulphur atom.

As indicated above, the reaction is especially useful in steroid synthesis and one particular application is the preparation of 6,19-ethers from 6-hydroxy steroids.

By the term "steroids" we mean compounds having the basic cyclopentanoperhydrophenanthrene ring structure and which may contain various substituents and/or double bonds, e.g. a keto, hydroxy or acyloxy group in the 3-position, alkyl groups in the 2-, 6- and 16-positions, keto, acetyl group etc. at the 20-position, keto, hydroxy, hydrocarbon, acyl groups etc. at the 17-position, a hydroxy or keto group at the 11- or 12-position, a hydroxy group at the 6-position, a hydroxy group at the 21-position, a double bond at the 1-and/or 4-position, a halogen atom such as fluorine in the 11- or 6-position etc.

Steroid 6,19-ethers may be converted by reduction to give 19-hydroxy steriods, some of which are of use in medicine as anabolic, estrogenic, progestational and antifertility agents. Preferred 6β-hydroxy steriods are those having a group in the 3-position which may be converted into a keto group, e.g. a 3β-acyloxy group of a 3-ketal or thioketal group, and a β-eliminatable substituent, such as a halogen atom or a mesyloxy or tosyloxy group, in the 5α-position; such steroids may be converted into their 6,19-ethers by the present process and then converted to 3-ketones and caused to undergo β-elimination to yield 4,5-dehydro-3-keto-steroid 6,19-oxides. These may then be reductively cleaved with dissolving metal or low valency metal ion reducing agents, e.g. zinc and acetic acid, chromous chloride, aluminium amalgam etc. to yield 4,5-dehydro-3-keto-19-hydroxy steroids such as 19-hydroxy progesterone which is physiologically active as a progestational agent. Conversion to the 3-ketone may be effected by mineral acid hydrolysis in the case of the ketals and thioketals and in the case of 3-acyloxy groups by mineral acid hydrolysis followed by oxidation with a reagent serving to oxidise on alcohol to a ketone, for example chromium trioxide, e.g. in acetone. β-Elimination may be affected under acid conditions and may take place spontaneously during oxidation. Preferred groups in other positions in the steroid molecule include a fluorine, chlorine or bromine atom in the 9-position, a protected or unprotected keto group in the 11-position, a protected or unprotected keto, acyloxy, acetyl, β-acetyl-α-acyloxy or octyl group at the 17-position and/or an alkyl group in the 2-, 6- or 16-position.

Other conformationally adjacent positions in the steroid molecule include the 11- and 18-positions and the 20- and 18-positions.

Where a nitrite ester of the alcohol to be iodinated or cyclised is used, the ester may be prepared, for example, by the methods conventional in the art, for example by reaction with a nitrosylating agent such as a nitrosyl halide, e.g. nitrosyl chloride or bromide.

In order that the invention may be well understood we give the following examples by way of illustration only. All temperatures are in ° C. and the compounds are identified with reference to the following formula drawings:

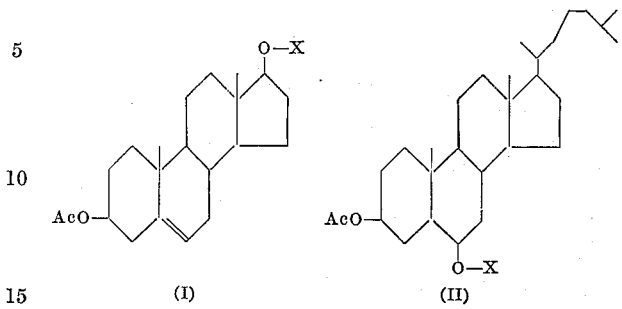

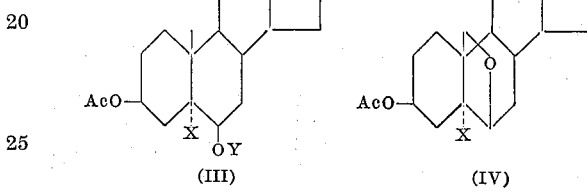

(a) R=cholesterol side chain
(b) R=17-O-Ac
(c) R=pregnane side chain
(d) R=17α-acetoxypregnane chain

EXAMPLE 1

*Photolysis of 3β-acetoxy cholestan-6β-ol and t-butyl nitrite*

A solution of the alcohol (IIIa, X=H; Y=H) (250 mg.) and t-butyl nitrite (4 cc.) in benzene (10 cc.) was photolysed with a 200 watt Hanovia lamp for 1 hour. Evaporation of the solvent, followed by crystallisation from methanol gave the nitrite (IIIa, X=H; Y=NO) (243 mg.), M.P. 147–149°, identical in all respects with an authentic specimen.

EXAMPLE 2

*Photolysis of Δ⁵,⁶-androstene-3,17-diol-3-acetate and t-butyl nitrite*

A solution of the alcohol (I, X=H) (500 mg.) and t-butyl nitrite (2 cc.) in CCl₄ (100 cc.) was stirred and photolysed for 1 hour with a 200 watt Hanovia lamp at room temperature. Removal of the solvent under vacuum gave the 17 nitrite (I, X=NO) (290 mg.). The I.R. of this was identical in all respects with that of an authentic specimen of 17-nitrite, prepared from the corresponding alcohol and nitrosyl chloride.

EXAMPLE 3

*Photolysis of 3β-acetoxy cholestan-6β-ol, in the presence of t-butyl hypochlorite, and iodine*

A solution of the alcohol (IIIa, X=H; Y=H) (500 mg.), iodine (2 g.) and t-butyl hypochlorite (0.5 cc.) in benzene (100 cc.) was photolysed for 45 min. with a 200 watt Hanovia lamp at room temperature. The reaction mixture was washed successively with aqueous sodium thiosulphate, and water; dried (Na₂SO₄). Evaporation of the solvent followed by crystallisation from methanol gave the oxide (IVa, X=H) (415 mg.) identical in all respects with an authentic specimen.

EXAMPLE 4

*Photolysis of 5α-chloro-6β-hydroxy-3β,17α-androstane in the presence of t-butyl hypochlorite and iodine*

A solution of the alcohol (IIIb, X=Cl; Y=H) and iodine (2 g.) in benzene (100 cc.) was photolysed for 1 hour as described above, and t-butyl hypochlorite (2 cc.)

was added in three portions. The reaction mixture was worked up as in the preceding experiment. Crystallisation of the mixture gave the ether (IVb, X=Cl) (320 mg.) identical in all respects with an authentic specimen.

EXAMPLE 5

*Photolysis of 5α-bromo-6β-hydroxy-3β,17β-diacetoxy-androstane in the presence of t-butyl hypochlorite and iodine*

A solution of the alcohol (IIIb, X=Br; Y=H) (500 mg.), iodine (2 g.) and t-butyl hypochlorite (0.5 cc.) in benzene (100 cc.) was photolysed for 45 minutes and worked up as in the previous examples to give the oxide (IVb, X=Br) (320 mg.), identical in all respects with an authentic specimen.

EXAMPLE 6

*Photolysis of 5α-chloro-6β-hydroxy-3β,17α-diacetoxy-pregnan-20-one in the presence of t-butyl hypochlorite and iodine*

A solution of the alcohol (IIId, X=Cl; Y=H) (500 mg.), iodine (2 g.) and t-butyl hypochlorite (0.5 cc.) in benzene (100 cc.) was photolysed and worked up as in the previous examples to yield the oxide (IVd, X=Cl) (350 mg.), identical in all respects with an authentic specimen.

EXAMPLE 7

*Photolysis of 3β-acetoxycholestan-6β-ol in the presence of t-butyl nitrite and iodine*

The alcohol (IIIa, X=R; Y=H) (500 mg.) and iodine (2 g.) in benzene (200 cc.) was photolysed with a 200 watt Hanovia high pressure Hg lamp. t-Butyl nitrite (0.3 cc.) was added to the reaction mixture in three portions over a period of 2 hours. Working up as in the previous examples yielded, after crystallisation from methanol, the oxide (IVa, X=H) (375 mg), identical in all respects with an authentic specimen.

EXAMPLE 8

*Photolysis of prednisolone bis-methylenedioxide-11-nitrite with iodine*

A solution of the above nitrite (2 g.) and $I_2$ (0.65 g.) in benzene (200 cc.) was photolysed at 15–20° for 1½ hours with a 500 watt Hanovia lamp. The reaction mixture was washed successively with aqueous $Na_2S_2O_3$, $H_2O$ and dried. Evaporation under vacuum, followed by trituration with ether gave a solid (1.4 g.).

The preceding crude product (1.1 g.) in acetone (100 cc.) was treated with an excess of Jones reagent at room temperature for three minutes and worked up as usual. The residue, after several recrystallisations from acetone-hexane, gave 18-iodo-prednisone bis-methylenedioxide (300 mg.), M.P. 186–189°, $[\alpha]_D$ +5° (0.8831, $CH_3Cl$), $$\lambda_{max.}^{KBr} \ 1718, 1665, 1620, 1600 \ cm.^{-1}$$

(Calculated for $C_{23}H_{27}O_6I$: C, 52.48; H, 5.17; O, 18.24; I, 24.11. Calculated for $C_{26}H_{33}O_7I$ (one mole of acetone): C, 53.43; H, 5.65; O, 19.16; I, 21.72. Found: C, 53.41; H, 5.30; O, 19.51; I, 22.01%.)

EXAMPLE 9

*Photolysis of prednisolone bis-methylenedioxide-11-nitrite in chloroform and iodine*

A solution of the above nitrite (1.25 g.) and $I_2$ (0.73 g.) in $CCl_4$ (20 cc.) and Conetron (120 cc.) was photolysed for 1½ hours using a 500 watt Hanovia lamp and worked up as described above. The crude residue was taken up in 5% methanolic KOAc (125 cc.) and refluxed for 1 hour. The reaction mixture was diluted with water and extracted with methylene chloride. After removal of solvent, the residue in methylene chloride-benzene 3:1 was chromatographed on alumina (40 g.), eluting with methylene chloride containing increasing amounts of methanol. The less polar fractions were combined and crystallised from acetone-hexane to yield the prednisolone bis-methylenedioxide-11,18-ether (375 mg.). The more polar fractions yielded prednisolone B.M.D. (155 mg.).

The 11,18-ether on recrystallisation from acetone-hexane had M.P. 255–60 $[\alpha]_D^{23}$ +5.08 (c.=0.996, $CHCl_3$), $$\lambda_{max.}^{MeOH} \ 242 \ (c.=16,160), \gamma_{max.}^{KBr} \ 1660, 1625, 1605 \ cm.^{-1}$$

(Found: C, 68.89; H, 6.92; O, 23.85. $C_{23}H_{28}O_6$ requires: C, 68.98; H, 7.04; O, 23.97%.)

EXAMPLE 10

*Photolysis of prednisolene-21-acetate-11-nitrite in the presence of iodine*

A solution of prednisolene - 21 - acetate - 11 - nitrite (3.2 g.) and $I_2$ (2.3 g.) in dry benzene (200 cc.) was photolysed for 2¾ hours using a 500 watt Hanovia mercury lamp. The reaction mixture was washed successively with aqueous $Na_2S_2O_3$ and water, dried and evaporated.

The preceding photolysis product in acetone (100 cc.) was oxidised with an excess of Jones' reagent at room temperature for three minutes. The reaction mixture was diluted with water and extracted with methylene chloride. After the usual work-up the residue was taken up in methylene chloride and chromatographed on alumina (80 g.), eluting with methylene chloride containing increasing amounts of methanol. The fractions from chromatography were divided into three groups and each group was chromatographed separately to afford three compounds, A, B, and C. Compound A (470 mg.) on crystallisation from acetone-hexane had M.P. 200–212° and its IR spectrum was identical to that of prednisone-21-acetate. Compound B (340 mg.) after several crystallisations from acetone hexane gave M.P. 176–178°, $[\alpha]_D^{22}$ +131.6 (c.=0.606, $CHCl_3$), $$\lambda_{max.}^{MeOH}$$

$\gamma_{max.}$ 1600 m.; 1740 s., 1710 s., 1660 v.s., 1610 m. cm.$^{-1}$. Compound C (480 mg.) was crystallised from acetone-hexane and had MP. 168–171°. An analytical specimen on recrystallisation from the same solvent had M.P. 170–171.5, $[\alpha]_D^{23}$ +144.0 (c.=1.007, $CHCl_3$), $$\lambda_{max.}^{MeOH} \ 237 \ (c.=13,000)$$

$\gamma_{max.}$ 3700 v.s., 1740 s., 1710 s., 1665 s., 1620 m., 1610 m. cm.$^{-1}$.

EXAMPLE 11

*Preparation of prednisolone-21-acetate-11,18-ether*

Prednisolone - 21 - acetate - 11 - nitrite (2.1 g.) and iodine (1.5 g.) in anhydrous benzene (215 cc.) was photolysed with a 550 watt Hg lamp for 2 hours. The reaction mixture was washed with aqueous $Na_2S_2O_3$ and worked up as usual. The residue was heated with methanolic KOAc (100 cc.; 5%) and heated under reflux under nitrogen for 30 minutes. The reaction after dilution with cold water, was extracted with $CH_2Cl_2$ and worked up as usual. The residue on chromatography on alumina (80 g.) using $CH_2Cl_2$ containing increasing amounts of methanol gave the desired 11,18-ether (5) (65 mg.), M.P. 190–195, $[\alpha]_D^{22.6}$ +109 (c.=1.07, $CHCl_3$), identical in all respects with a specimen prepared by another method.

EXAMPLE 12

*Photolysis of 3β-acetoxycholestan-6β-yl nitrite and iodine*

A solution of 30 - acetoxycholestan - 6β - yl nitrite (R=NO) (742 mg.) and $I_2$ (238 mg.) in benzene (150 cc.) was photolysed for 1¼ hours under $N_2$ at room temperature using a 550 watt mercury lamp. The reaction mixture was washed successively with 10% aqueous $Na_2S_2O_3$ and water, dried over $Na_2SO_4$ and evaporated to dryness. The oil was refluxed for 15 mins. with 5% methanolic KOAc (50 cc.), then water was added and the reaction mixture was extracted with $CH_2Cl_2$ and worked up as usual. Crystallisation from $CH_3OH$ afforded the oxide (IV; X=H; R=cholesterol side chain) (346 mg.), M.P. 105–110° C., and a second crop of the 6-ketone (294 mg.).

EXAMPLE 13

*Photolysis to give after cyclization 11,18-epoxy prednisolone bis-methylene dioxide (B.M.D.)*

A solution of prednisolone - B.M.D. - 11β - nitrite (1.25 g.) and iodine (0.73 g.) in carbon tetrachloride (20 cc.) and Genetron (120 cc.) was photolysed with a 550 watt high pressure Hg lamp for 1½ hrs. After being washed with sodium thiosulphate the organic layer was worked up as usual. The residue was then taken in 5% methanolic potassium hydroxide (120 cc.) and heated on a steam bath under nitrogen for 30 minutes. The reaction mixture was diluted with water and extracted with methylene chloride. After removal of solvents, the residue in methylene chloride benzene 3:1 was chromatographed on alumina (40 g.), eluting with methylene chloride containing increasing amounts of methanol. The less polar fractions were combined and crystallised from acetone-hexane to yield 11,18 - epoxy - prednisolone - B.M.D. (375 mg.; 29%). The more polar fractions yielded prednisolone-B.M.D. (155 mg.).

The oxide (8) on recrystallisation from acetone-hexane had M.P. 255–260 $[\alpha]_D^{23}$ +5.08° (c.=0.996, $CHCl_3$)

$\lambda_{max.}^{MeOH}$ 242 mµ ($\epsilon$ = 16,160), $\gamma_{max.}^{KBr}$ 1660, 1625, 1605 cm.$^{-1}$

*Analysis.*—Calcd. for $C_{23}H_{28}O_6$: C, 68.98; H, 7.04; O, 23.97. Found: C, 68.89; H, 6.92; O, 23.85.

EXAMPLE 14

*11,18-epoxy-prednisolone*

The B.M.D. derivative from Example 13 (300 mg.) was added to a boiling mixture of 40% aqueous formic acid (15 cc.) and ethylene glycol (0.9 cc.), while a slow stream of nitrogen bubbling the reaction mixture was refluxed for 3 hours. The latter was then poured into ice-water and extracted with methylene chloride. The residue was chromatographed on alumina to yield the starting material (50 mg.) and then a more polar solid which, after crystallisation from acetone-hexane, gave 11,18-epoxy-prednisolone (75 mg., 25%), M.P. 221–228°, $[\alpha]_D^{20.8}$ +7.1° (c., 0.71, dioxane);

$\lambda_{max.}^{MeOH}$ 243 mµ ($\epsilon$ = 15,800); $\nu_{max.}^{KBr}$ 3600, 1710, 1660, 1620 and 1605 cm.$^{-1}$

*Analysis.*—Calcd. for $C_{21}H_{26}O_5$: C, 70.37; H, 7.31; O, 22.32. Found: C, 70.18; H, 7.16; O, 22.50.

EXAMPLE 15

*11,18-epoxy-prednisolone 21-acetate*

A solution of 11,18-epoxy-prednisolone (60 mg.) in pyridine (5 cc.) and acetic anhydride (1 cc.) was left overnight at room temperature. The product which was isolated as usual was chromatographed on Florisil (magnesium silicate) to yield after crystallisation from acetone-hexane 11,18-epoxy-prednisolone 21-acetate (35 mg.), M.P. 199–206°, $[\alpha]_D^{21}$ +102° (c., 0.816, $CHCl_3$);

$\lambda_{max.}^{MeOH}$ 243 mµ ($\epsilon$ = 13,500); $\nu_{max.}^{KBr}$ 3500, 1750, 1710, 1660 and 1600 cm.$^{-1}$

*Analysis.*—Calcd. for $C_{23}H_{28}O_6$: C, 68.97; H, 7.05; O, 23.98. Found: C, 68.49; H, 6.79.

EXAMPLE 16

*Oxidation of 11,18-epoxy-prednisolone to 11,18-epoxy-androsta-1,4-dien-3,17-dione*

11,18-epoxy-prednisolone (30 mg.) in acetone (5 cc.) was oxidized with excess Jones' reagent and the reaction mixture was worked up as usual. Crystallisation from acetone-hexane gave 11,18-epoxy-androsta-1,4-dien-3,17-dione (10 mg.), M.P. 149–167° C.; identical in all respects with an authentic specimen.

EXAMPLE 17

*Photolysis to give after oxidation 18-iodoprednisone B.M.D.*

A solution of 17,20;20,21-bis-methylene dioxyprednisolone 11-nitrite (M. Akhtar, D. H. R. Barton, J. M. Beaton and A. G. Hortmann, JACS 85, 1512 (1963)) (2.0 g.), and iodine (0.65 g.) in benzene (200 cc.) was photolysed at 15–20° for 1½ hours with a 550 watt Hanovia lamp. The photolysis mixture was washed successively with aqueous sodium thiosulphate and water and dried ($Na_2SO_3$). Evaporation under vacuum followed by trituration with ether gave a solid (1.4 g.).

The preceding crude solid (1.1 g.) in acetone (100 cc.) was treated with an excess of Jones' reagent at room temperature for 3 mins. The excess of the reagent was decomposed with methanol and the reaction mixture was worked up as usual. The residue after several crystallisations from acetone-hexane gave 18-iodo-17,20;20,21-bis-methylenedioxyprednisone (300 mg.), M.P. 186–189°, $[\alpha]_D$ +5° (c., 0.883 $CHCl_3$);

$\nu_{max.}^{KBr}$ 1710, 1665, 1620, 1600 cm.$^{-1}$, $\lambda_{max.}^{CH_3OH}$ 237 mµ; $\epsilon$ = 16,800

*Analysis.*—Calcd. for $C_{23}H_{27}O_6I \cdot C_3H_6O$: C, 53.43; H, 5.69; O, 19.16; I, 21.72. Found: C, 53.41; H, 5.30; O, 19.51; I, 22.01.

EXAMPLE 18

*12,18-cyclo-17,20;20,21-bis-methylenedioxyprednisone*

A solution of the iodo-ketone (580 mg.) in methanolic potassium hydroxide (100 cc.) was refluxed under nitrogen for 1 hour. After partial evaporation of the solvent under vacuum, the reaction mixture was worked up as usual. Crystallisation of the residue from acetone-hexane gave 12,18-cyclo-17,20;20,21 - bis - methylenedioxyprednisone (315 mg., 72%) M.P. 288.5–289.5°, $[\alpha]_D^{21}$ −20.8° (c., 1.088, $CHCl_3$);

$\nu_{max.}^{KBr}$ 1660, 1625, and 1600 cm.$^{-1}$ $\nu_{max.}^{CHCl_3}$ 1680, 1660, 1625 and 1610 cm.$^{-1}$; $\lambda_{max.}^{MeOH}$ 240 mµ ($\epsilon$ = 16,350)

*Analysis.*—Calcd. for $C_{23}H_{26}O_6$: C, 69.32; H, 6.58; O, 24.09. Found: C, 69.20; H, 6.59; O, 23.89.

The above mentioned compound can be obtained in 25% overall yield from the nitrite when the photolysis mixture of ketones is subjected to base treatment followed by chromatography.

EXAMPLE 19

*Treatment of 12,18-cyclo-17,20;20,21-bis-methylenedioxyprednisone with hydrogen iodide*

A mixture of the 12,18-cyclo derivative from Example 18 (50 mg.), acetic acid (3 cc.), acetic anhydride (5 cc.) and aqueous hydroiodic acid (0.1 cc., 47%) was stirred under nitrogen for ½ hour. The reaction mixture was then poured into aqueous sodium thiosulphate (100 cc., 2%) and the product extracted with methylene chloride. Crystallisation from acetone-hexane gave 18-iodo-17,20;20,21-bis-methylenedioxyprednisone (27 mg., 41%) identical in all respects with the authentic specimen.

EXAMPLE 20

*Photolysis of prednisolone 21-acetate 11β-nitrite and iodine to give after cyclization 11,18-epoxyprednisolone 21-acetate*

A solution of prednisolone 21-acetate 11-nitrite (2.5 g.) and iodine (1.2 g.) in dry benzene (165 cc.) was photolysed for 2¾ hours using 550 watt Hanovia lamp. The photolysis mixture was worked up as usual and solvent was removed under vacuum at 30° C. The residue was chromatographed over alumina (70 g.) in methylene chloride containing increasing amounts of methanol to give two compounds. Less polar on crystallisation from acetone-hexane gave 11,18-epoxyprednisolone 21-acetate (330 mg.).

Recrystallisation from acetone-hexane gave M.P. 198–208°, $[\alpha]_D^{22.6}$ +109° (c., 1.07, CHCl$_3$). This compound was identical in all respects with the material described above. The more polar compound (150 mg.) which crystallised from acetone-hexane was shown to be identical with prednisolone 21-acetate.

EXAMPLE 21

*Photolysis of prednisolone 21-acetate 11β-nitrite and iodine to give after oxidation with Jones' reagent 18-iodoprednisone 21-acetate*

A solution of prednisolone 21-acetate 11β-nitrite (3.2 g.) and iodine (2.3 g.) in dry benzene (200 cc.) was photolysed and worked up as described above. The residue in acetone (100 cc.) was oxidized with an excess of Jones' reagent at room temperature for three minutes. The reaction mixture was decomposed with methanol, diluted with water and extracted with methylene chloride. Chromatography over alumina (80 g.) with methylene chloride containing increasing amounts of methanol. The fractions from chromatography were divided into three groups and each group chromatographed separately to afford three compounds. The least polar compound (470 mg.) on crystallisation from acetone-hexane had M.P. 200–212° and its intra-red spectrum was identical to that of pure prednisone 21-acetate. The compound of intermedial polarity (340 mg.) on crystallization for acetone-hexane afforded beautiful plates, M.P. 176–178°, and was proved to be a 1:1 mixture of prednisone 21-acetate and 10-iodoprednisone 21-acetate. The most polar compound (480 mg.) crystallised from acetone-hexane and had M.P. 168–171°. Analytical sample on recrystallisation from acetone-hexane gave 18-iodoprednisone 21-acetate, M.P. 170–171.5°, $[\alpha]_D^{23}$+144° (c., 1.007, CHCl$_3$);

$\lambda_{max.}^{MeOH}$ 238 mµ ($\epsilon$=16,053); $\nu_{max.}^{KBr}$ 3700, 1740, 1665, 1620, and 1610 cm.$^{-1}$

*Analysis.*—Calcd. for C$_{23}$H$_{27}$O$_6$I: C, 52.48; H, 5.17; O, 18.24; I, 24.11. Found: C, 52.58; H, 5.04; O, 18.13; I, 24.13.

EXAMPLE 22

*Photolysis of Δ$^{1,4}$-androstdiene-3,17-dione-11β-yl-nitrite to give the corresponding 11,18-oxide*

Δ$^{1,4}$-androstdiene-3,17-dione-11β-ol was treated with nitrosyl chloride in the usual manner to yield the corresponding nitrite (900 mg.). This was added to a solution of iodine (1.6 g.) in benzene (800 cc.) and photolysed with a 550 watt lamp for 3 hours as usual and worked up as described above. The oily residue was then refluxed in methanolic potassium acetate (100 cc.; 5%) for 1 hours. Water was added and the product was extracted with methylene chloride. Chromatography of the residue over alumina (30 g.) in methylene chloride containing increasing amounts of methanol gave, after crystallisation from acetone-hexane, the 11,18-oxide (190 mg.), M.P. 168–171°, $[\alpha]_D^{21}$+196° (c., 1.115, CHCl$_3$), $\lambda_{max.}^{MeOH}$ 242 mµ ($\epsilon$=15,000); $\nu_{max.}^{KBr}$ 1740, 1660, 1625, 1600 cm.$^{-1}$

*Analysis.*—Calcd. for C$_{19}$H$_{22}$O$_3$: C, 76.48; H, 7.43; O, 16.09. Found: C, 76.46; H, 7.19; O, 16.15.

EXAMPLE 23

*12,18-cyclo-Δ$^{1,4}$-androstdiene-3,11,17-trione*

A solution of Δ$^{1,4}$-androstdiene-3,17-dione-11β-yl nitrite (6.5 g.) and iodine (2.8 g.) in dry benzene was photolysed with a 550 watt lamp for 6 hours and processed as described above. The residue in acetone (100 cc.) was treated with an excess of Jones' reagent for 3 minutes, decomposed with methanol, diluted with water and extracted with methylene chloride. The residue was then refluxed in methanolic potassium acetate (500 cc.; 5%) for six hours. Chromatography on alumina (700 g.) in methylene chloride containing increasing amounts of methanol gave Δ$^{1,4}$-androst-diene-3,11,17-trione (947 mg.) and 12,18-cyclo-Δ$^{1,4}$-androstdiene-3,4,17-trione (800 mg.). Analytical specimen of this crystallized from acetone-hexane and had M.P. 165–167°, $[\alpha]_D^{2.52}$+141.5° (CHCl$_3$, c.=1.00);

$\lambda_{max.}^{MeOH}$ 243 mµ ($\epsilon$=12,000), $\nu_{max.}^{KBr}$ 1740, 1664, 1620 1600 cm.$^{-1}$

*Analysis.*—Calcd. for C$_{19}$H$_{20}$O$_3$: C, 77.00; H, 6.81; O, 16.20. Found: C, 76.80; H, 7.40; O, 16.57.

When in the above experiment silver acetate was used, instead of potassium hydroxide, in the cyclisation, somewhat similar yield of the 12,18-cyclo compound was obtained.

EXAMPLE 24

*18-iodoprednisolone-21-acetate*

Prednisolone 11β-nitrite-21-acetate, freshly prepared prednisolone acetate (4.1 g.) and iodine (0.85 g.) in dry benzene (175 ml.) were photolyzed with a 550 watt lamp using a Pyrex filter for 2¼ hours at room temperature. Some material had precipitated out during reaction and was dissolved in methylene chloride (100 ml.) and added to the solution. The latter was washed with sodium thiosulphate solution (100 ml., 1%) and water 3 x 100 ml.) before drying (Na$_2$SO$_4$), filtering, and careful evaporation in vacuo. The residual gum was dissolved in methylene chloride (10 ml.) when crystallisation commenced to give 18 - iodoprednisolone - 21 - acetate (0.623 g.; 18%), M.P. 129–133° (dec.). Repeated crystallisation from methylene chloride yielded colourless prisms, M.P. 131–134° (dec.), $[\alpha]_D^{25}$+93.2° (CHCl$_3$, c=0.86); $\nu_{max.}^{Nujol}$ 3600–3250 (m.) 1750 (s.), 1740 (s.), 1660 (s.), 1610 (m.) and 1600 (m.) cm.$^{-1}$; $\lambda_{max.}^{MeOH}$ 242 mµ ($\epsilon$, 18,000)

(Found: C, 52.14; H, 5.50; I, 24.07; O, 18.21. C$_{23}$H$_{29}$IO$_6$ requires: C, 52.35; H, 5.59; I, 24.04; O, 18.17%.)

EXAMPLE 25

*(a) 18-iododexamethasone acetate*

Dexamethasone-11β-nitrite-21-acetate, freshly prepared from dexamethasone acetate (1.64 g.), was irradiated with iodine (0.45 g.) in benzene (125 ml.) for 2 hrs. before working up as above to yield the desired iodohydrin (0.79 g.; 37%), M.P. 130–133° (dec.), as plates. Repeated crystallisation from chloroform gave colourless prisms, M.P. 140–144° (dec.); $[\alpha]_D^{26}$+89.2° (CHCl$_3$, c.=0.83);

$\nu_{max.}^{Nujol}$ 3600 (s.), 3500 (m., broad), 1760 (s.), 1720 (s.), 1670 (s.), 1620 (m.) and 1610 (m.) cm.$^{-1}$. $\lambda_{max.}^{EtOH}$ 236 mµ ($\epsilon$, 12,600)

(Found: C, 51.40; H, 5.23; I, 22.52. C$_{24}$H$_{30}$IFO$_6$ requires: C, 51.50; H, 5.40; I, 22.66%.)

*(b) Jones' oxidation of 18-iododexamethasone acetate*

The iodohydrin prepared in (a) above (0.605 g.) in acetone (30 ml.) cooled to +5° was stirred with Jones' reagent (1.25 ml., 4 N) for 30 minutes, being allowed to warm to room temperature during this time. Working up by methylene chloride extraction gave, from methylene chloride-ether (1:3) prisms of 9α-fluoro-18-iodo-16α-methyl-prednisone-21-acetate (0.327 g., 54.5%), M.P. 135–139° (dec.). The analytical sample had M.P. 145–150° (dec.); $[\alpha]_D^{29.5°}$+125° (CHCl$_3$, c.=0.82);

$\nu_{max.}^{Nujol}$ 3500 (w.), 1760 (s.) 1740 (v.s.), 1665 (s.), 1620 (m), 1600 (m.) cm.$^{-1}$; $\lambda_{max.}^{EtOH}$ 233 mµ ($\epsilon$=14,980)

(Found: C, 51.63; H, 5.30; I, 22.94. C$_{24}$H$_{28}$FIO$_6$ requires: C, 51.70; H, 5.06; I, 22.74%.)

EXAMPLE 26

Using the procedure of Example 12, 3β-acetoxy-6β-hydroxy-cholestan-6β-yl nitrite and iodoform were photolysed in benzene under $N_2$ at room temperature using a 550 watt mercury lamp.

The reaction mixture was worked up as in Example 12 to yield the oxide (IV, X=H; R=cholesterol side chain, M.P. 105–110° C.).

If desired, the iodoform used in Example 26 can be replaced by other organic iodides having a labile iodine atom, for example carbon tetraiodide, ethylene diiodide, allyl iodide, benzyl iodide etc. In general, the iodine used in the process according to the invention can be replaced by an organic iodide having a liabile iodine atom, and this modification constituates a further feature of the invention.

It will be noted that when 11-keto-18-iodo steroids are treated with a base one obtains the corresponding 12,18-cyclo-compound. Thus for example, 18-iodo-prednisone B.M.D. derivative with a base such as an alkali metal hydroxide, e.g. potassium hydroxide, gives 12,18-cyclo-prednisone B.M.D. derivative.

Of the compounds disclosed in the foregoing description and examples, a number are new compounds and constitute a further feature of the invention. Thus, the 18-iodo steroids have never previously been described and we have found that those we have examined possess interesting pharmacological properties. Thus, for example, 18-iodo-dexamethasone possesses anti-anabolic and anti-inflammatory properties in man (and domestic animals) and, as such, is useful in the treatment of "inflammatory diseases" such as rheumatoid arthritis, rheumatic fever, bursitis, etc., pemphigus and other diseases of the skin; in general, all those diseases which have been recorded as responding favourably to therapy with cortisone, cortisol, prednisone, prednisolone, respond to treatment with 18-iodo-dexamethasone. This new compound has a favourable effect with respect to salt and water balances in that retention of salt and water is not induced in the ordinary therapy of these diseases. An additional novel and favourable effect of treatment with 18-iodo-dexamethasone relates to calcium and phosphorus balances. For example, patients with low serum calcium and phosphorus levels respond to therapy with 18-iodo-dexamethasone with an elevation of serum calcium and a depression of serum phosphorus.

18-iodo-prednisone has the same effects as 18-iodo-dexamethasone but is less potent, while 18-iodo-prednisolone and 18-iodo-11-dehydro-dexamethasone have largely the same type of activity as 18-iodo-dexamethasone.

Similarly, various analogues of 18-iodo-prednisone and 18-iodo-prednisolone with substituents at 6, 9, and 16, have similar properties, e.g., 6α-methyl, 6α-halo, 9α-halo, 16α-methyl, 16α-hydroxy, 16β-methyl also have properties similar to those of 18-iodo-dexamethasone.

18-iodo-$\Delta^{1,4}$-androstadiene - 3,11,17 - trione possesses anabolic properties with a favour ratio of anabolic to androgenic activities. As such, it is useful in treatment of patients who are deficient in anabolic hormone; for example, hypopituitarism, hypogonadism, hypoadrenal-corticoidism, and is beneficial in treatment of the elderly individuals in whom a degree of protein protoplasm has risen because of decrease gonadal function, poor dietary intake, chronic diseases, etc.

Other new compounds according to the invention include $\Delta^{1,4}$ - androstadiene-3,17-dione-11,18-oxide which possesses anabolic properties with a minimum of androgenic properties and, as such, is useful in treatment of patients in whom it is desired to effect an anabolic response with a minimum androgenic response; for example, geriatric patients and chronic disease patients.

Another new compound is 11,18-oxido-prednisolone which possesses anti-anabolic and anti-inflamatory properties and, as such, is useful in treatment of inflammatory diseases such as rheumatoid arthritis, nephrosis, bursitis, skin diseases, etc. In addition, it has a favourable effect on salt and water balance leading to a loss of salt and water, and overcoming the salt and water retaining effects of aldosterone.

11,18-oxido-dexamethasone has similar properties to 11,18-oxido-prednisolone but is more potent while 12,18-cyclo-prednisolone also has properties of this type. 12,18 - cyclo-$\Delta^{1,4}$-androstadiene-3,11,17-trione possesses properties similar to those of 18-iodo-$\Delta^{1,4}$-androstadiene-3,11,17-trione.

I claim:

1. A process for the preparation of steroid compounds containing the grouping

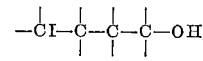

or upon elimination of hydrogen iodide, the grouping

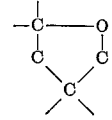

comprising reacting a compound selected from the group consisting of steroid alcohols containing the grouping

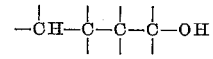

and nitrite esters thereof with a member selected from the group consisting of iodine and an organic iodide having a labile iodine atom and, where said alcohol is used, a compound selected from the group consisting of hypochlorite, hypobromite and nitrite esters of tertiary alcohols.

2. A process as claimed in claim 1 in which the reaction is effected thermally at a temperature above 20° C.

3. A process as claimed in claim 1 in which the reaction is effected photolytically by irradiation with radiation of a wave length absorbed by the hypohalite or nitirate radical and by iodine.

4. A process as claimed in claim 3 in which the starting compound is a nitrite ester of said alcohol.

5. A process as claimed in claim 1 in which the said tertiary alcohol is t-butanol.

6. A process as claimed in claim 1 in which the reaction is effected in the presence of a solvent.

7. A process as claimed in claim 6 in which the solvent is carbon tetrachloride.

8. A process as claimed in claim 1 in which the steroid alcohol carries at least one member selected from the group consisting of 9α-fluoro, 9α-chloro, 9α-bromo, a protected or unprotected keto group in the 11-position, a protected or unprotected keto group of the 17-position, 17-acyloxy, 17-acetyl, 17β-acetyl-17α-acyloxy, 17-octyl, 2-alkyl, 6-alkyl and 16-alkyl.

9. A process as claimed in claim 1 in which the steroid alcohol is a hydroxy steroid selected from the group consisting of 6β-hydroxy-10-methyl steroids and 11β-hydroxy-13-methyl-steroids.

10. A process as claimed in claim 9 in which the hydroxy steroid possesses in the 3-position a group convertible into a keto group.

11. A process as claimed in claim 10 in which the hydroxy steroid also possesses a substituent in the 5α-position selected from the group consisting of halo, mesyloxy and tosyloxy.

12. A process as claimed in claim 11 in which said hydroxy steroid is converted into the corresponding cyclic ether, followed by conversion of the group in the 3-position to a keto group and subsequent β-elimination at the 5α-position to yield the corresponding 4,5-dehydro-3-keto cyclic ether which is then reductively cleaved using a reducing agent selected from the group consisting of dissolving-metal and low-valency-metal-ion reducing agents to yield the corresponding hydroxy steroid.

13. A process as claimed in claim 1 in which an organic iodide having a labile iodine atom is used and said iodide is iodoform.

14. A compound selected from the group consisting of a compound of the formula

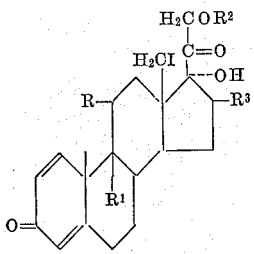

where R is a member selected from the group consisting of keto and β-hydroxy, $R^1$ is a member selected from the group consisting of hydrogen and α-fluoro, $R^2$ is a member selected from the group consisting of hydrogen and lower alkanoyl and $R^3$ is a member selected from the group consisting of hydrogen and α-methyl; and bis-lower alkylenedioxy derivatives thereof.

15. A compound of the formula

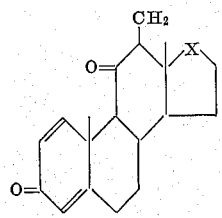

where X is a member selected from the group consisting of

and

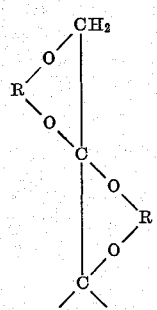

where R is lower alkylene.

16. A compound selected from the group consisting of a compound of the formula

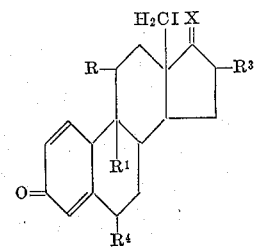

where X is a member selected from the group consisting of keto and the grouping

R is a member selected from the group consisting of keto and β-hydroxy, $R^1$ is a member selected from the group consisting of hydrogen and α-halo, $R^2$ is a member selected from the group consisting of hydrogen and lower alkanoyl, $R^3$ is a member selected from the group consisting of hydrogen, α-methyl, β-methyl, and α-hydroxy and $R^4$ is a member selected from the group consisting of hydrogen, α-methyl and α-halo; and bis-lower alkylenedioxy derivatives of said compound in which X is

References Cited by the Examiner
UNITED STATES PATENTS

| | | | |
|---|---|---|---|
| 3,008,957 | 11/1961 | Ringold et al. | 260—239.55 |
| 3,065,228 | 11/1962 | Bowers | 260—239.55 |
| 3,067,198 | 12/1962 | Wettstein et al. | 260—239.55 |
| 3,174,969 | 3/1965 | Wettstein et al. | 260—239.55 |
| 3,178,346 | 4/1965 | Wettstein et al. | 260—239.55 |
| 3,178,414 | 4/1965 | Meystre et al. | 260—239.55 |
| 3,211,726 | 10/1965 | Wettstein et al. | 260—239.55 |

LEWIS GOTTS, *Primary Examiner.*

H. A. FRENCH, *Assistant Examiner.*